United States Patent [19]

Hsu

[11] Patent Number: 4,601,925
[45] Date of Patent: Jul. 22, 1986

[54] RACE TRACK CUSHIONING SURFACE

[76] Inventor: Samuel K. Hsu, 14 Po Shin Street 1st Fl., Hong Kong, Hong Kong

[21] Appl. No.: 662,138

[22] Filed: Oct. 18, 1984

[51] Int. Cl.⁴ .................. B32B 5/26; B32B 25/10
[52] U.S. Cl. ............................ 428/17; 428/2;
428/215; 428/218; 428/292; 428/496; 428/532
[58] Field of Search .............. 428/2, 17, 215, 218,
428/292, 295, 326, 496, 532

[56] References Cited

U.S. PATENT DOCUMENTS

| | | | |
|---|---|---|---|
| 3,786,011 | 1/1974 | Price et al. | 428/17 |
| 4,202,803 | 5/1980 | Signoretto | 428/496 |
| 4,301,207 | 11/1981 | Schomerus | 428/241 |
| 4,336,286 | 6/1982 | Tomarin | 428/17 |

Primary Examiner—Paul J. Thibodeau
Attorney, Agent, or Firm—Oltman and Flynn

[57] ABSTRACT

The invention relates to a cushion for use on top of a hard paving material in a race track or playing field and comprises three rubber coated coconut husk fiber bodies superimposed on each other. The fibrous bodies are adhesively bonded to each other by rubber adhesive and the middle layer has the coconut fibers compressed to a lesser extent than the compression of the fibers in the upper and lower layers.

1 Claim, 3 Drawing Figures

RACE TRACK CUSHIONING SURFACE

BACKGROUND OF THE INVENTION

This invention relates to race track surfaces, and more particularly, to a surface for racing that provides a cushioning surface effect.

It is well know that certain types of surfaces are well suited for racing or running on the surface. Such surfaces have a slight, cushioning, springy or elastic reaction to the impact of feet or hooves of a running person or horse. Such surfaces are traditionally prepared by means of a mixture of wood fiber, sand, chipped straw and other organic materials that have been found suitable for the purpose.

Most types of organic materials, however, have the drawback that they rot and become unsuitable for a race track surface.

An instant invention discloses a race track surface that is constructed by means of a combination of coconut husk fibre and natural rubber latex, which together form a cushioning material that drains well and is inhibited in regard to rotting.

In the contemplated use the racing surface will be constructed atop a stable, hard layer on which a layer or rubberised coconut fibre material is deposited, followed by a layer of sand on top of the rubberised coconut fibre material.

Such a surface has been found to have almost the ideal consistency for a racing surface in regard to elasticity and rebound capabilities.

The rubberised coconut fibre material is constructed of long and short fibres, sprayed with rubber latex, then vulcanised to provide a good adhesion between the fibres, and are chemically treated to resist rot.

The rubberised coconut fibre material is advantageously configured in the form of flat carpet-like slabs of a maximum dimension of 5'×7', and can be easily laid over the track. For purposes of joining the slabs together, a strong rubber adhesive is used.

A patent search was conducted in order to determine prior art. Essentially, no prior art was indentified.

Further objects and advantages of this invention will be apparent from the following detailed description of presently preferred embodiments which are illustrated schematically in the accompanying drawings.

DETAILED DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
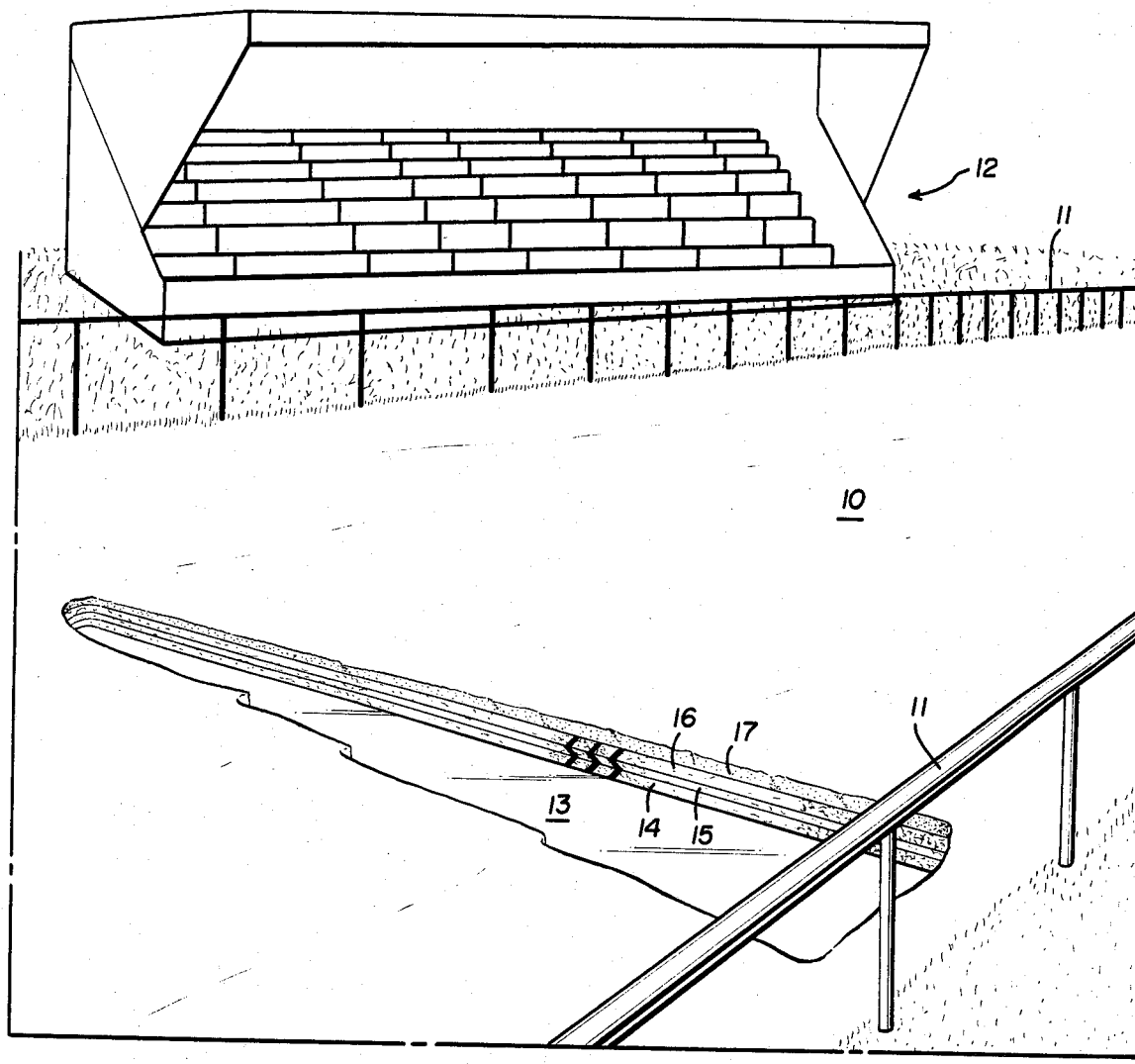
FIG. 1 is a perspective view of a race track with viewing stand and a part of the track surface broken away to show the layering of the track surface.
Figure 2:
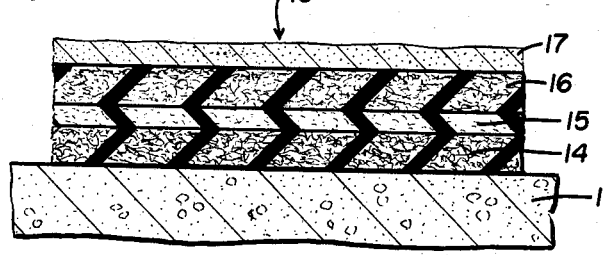
FIG. 2 is an enlarged fragmentary detailed view of the race track surface showing the various layers.
Figure 3:
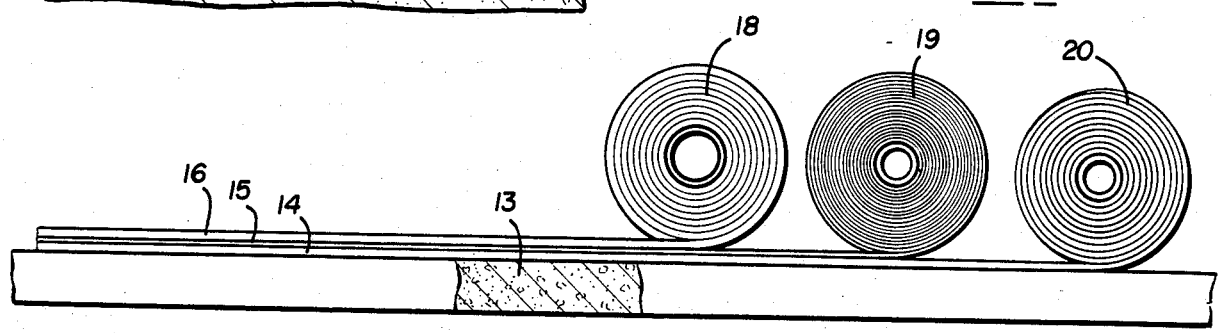
FIG. 3 is an elevational view of three layers of rubberised coconut fibre material being laid down as a race track surface.

FIG. 1, a part 10 of a race track is seen between the railings 11 usually provided to delineate the race track. A viewing stand 12 is shown in order to provide an indication of the orientation of the race track 10.

At the left side of the drawing, a vertical cut through the race track surface is seen in order to show the layering of the race track surface 10. A bottom layer 13 is a hard base, which is typically made of poured concrete or asphalt-stone aggregate or any other suitable, reasonably hard paving material, the exact type of which is immaterial to the instant invention.

The rubberised coconut fibre material is applied in the form of three layers, of which the bottom layer 14 is approximately 1 inch thick, the next layer 15 is approximately ½ inch thick, and the top layer 16 is also approximately 1 inch thick, similar in form and construction to the bottom layer 14.

The middle layer 15 is advantageously compressed to lesser intensity so that it is less compact and more springy to provide for better cushioning effect.

The uppermost layer 17 is typically sand, as is usually provided on race tracks.

The rubberised coconut husk fibre material used in the layers 14, 15 and 16 is typically composed of a mixture of long and short fibres, as they are naturally obtained by defibrating the husk of coconuts. Such coconut husk fibre material is abundantly available. The fibres may be treated with rot resistant preservatives, such as oil-based preservatives which comprise creosote, pentachlorophenol, copper naphtenate and others. There are also water-based preservatives available.

After treatment with a suitable preservative, the coconut husk fibre material is compressed to the desired degree of denseness and thickness in suitable machines of well known construction and then sprayed with rubber latex which provides adhesion between the fibres, after the latex has been cured by vulcanisation.

The rubberised coconut fibre surface material readily drains water, and when treated with preservatives as described above, is very resistant to rot and fungi, and therefore very durable.

It is to be understood that the composition described hereinabove is typical only, and that the surface material, according to the teachings of the invention, may be applied in other degress of density and thickness. It is also to be understood that the composition of short and long fibres and latex content may be varied within a wide range.

I claim:

1. A cushion for use on top of a hard paving material in a race track or playing field consisting of three rubber-coated coconut husk fiber bodies superimposed on each other, each of said bodies comprising a mass of coconut husk fibers treated with rot resistant material and compressed into a carpet-like slab and natural rubber latex coating the coconut husk fibers and vulcanized to bond them together as a coherent flexible body, said superimposed bodies being adhesively bonded to each other by rubber adhesive to form a three layer cushion having an upper layer substantially one inch thick, a middle layer substantially one-half inch thick, and a lower layer substantially one inch thick, said middle layer having its coconut husk fibers compressed to a lesser extent than the compression of the fibers in said upper and lower layers.

* * * * *